(12) United States Patent
Grosch et al.

(10) Patent No.: US 10,711,686 B2
(45) Date of Patent: Jul. 14, 2020

(54) METHODS AND SYSTEM FOR STARTING AN ENGINE

(71) Applicant: Ford Global Technologies, LLC, Dearborn, MI (US)

(72) Inventors: Guenter Grosch, Vettweiss (DE); Andreas Kuske, Geulle (NL); Franz Arnd Sommerhoff, Aachen (DE); Rainer Lach, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 16/002,678

(22) Filed: Jun. 7, 2018

(65) Prior Publication Data

US 2019/0010860 A1  Jan. 10, 2019

(30) Foreign Application Priority Data

Jul. 7, 2017 (DE) .................. 10 2017 211 675
Jul. 7, 2017 (DE) .................. 10 2017 211 684

(51) Int. Cl.
| | | |
|---|---|---|
| *F02B 29/04* | (2006.01) | |
| *F02D 41/00* | (2006.01) | |
| *F02B 33/44* | (2006.01) | |
| *F02B 39/10* | (2006.01) | |

(52) U.S. Cl.
CPC ...... *F02B 29/0406* (2013.01); *F02B 29/0493* (2013.01); *F02B 33/44* (2013.01); *F02B 39/10* (2013.01); *F02D 41/0002* (2013.01); *F02D 41/0007* (2013.01); *F02D 2200/0418* (2013.01)

(58) Field of Classification Search
CPC .. F02B 29/0406; F02B 39/10; F02B 29/0493; F02B 33/44; F02B 37/16; F02B 37/04; F02B 37/013; F02B 29/04; F02D 41/0002; F02D 41/0007; F02D 2200/0418
USPC .......................................................... 123/563
See application file for complete search history.

(56) References Cited

U.S. PATENT DOCUMENTS

| | | |
|---|---|---|
| 7,980,076 B2 | 7/2011 | Buia et al. |
| 8,061,135 B2 | 11/2011 | Rutherford |
| 8,733,327 B2 | 5/2014 | Diem et al. |
| 9,359,941 B2 | 6/2016 | Norman et al. |
| 9,541,433 B2 | 1/2017 | Wagner et al. |
| 2004/0079079 A1 | 4/2004 | Martin et al. |
| 2011/0094219 A1 | 4/2011 | Palm |

FOREIGN PATENT DOCUMENTS

| | | |
|---|---|---|
| DE | 3906747 A1 | 9/1990 |
| DE | 19853455 A1 | 6/1999 |
| DE | 19911251 A1 | 9/2000 |
| DE | 10238839 A1 | 3/2004 |
| DE | 102007043992 A1 | 3/2009 |
| DE | 102009011634 A1 | 11/2009 |

(Continued)

*Primary Examiner* — Laert Dounis
*Assistant Examiner* — Edward Bushard
(74) *Attorney, Agent, or Firm* — Geoffrey Brumnaugh; McCoy Russell LLP

(57) ABSTRACT

A description is given of a device (1) for pressure-charging a combustion engine (31), which comprises a compressor (2), a charge air cooler (3), an inlet (4) and a charger (5), which are connected to one another in terms of flow by flow ducts (8, 9, 10). In this device, the charge air cooler (3) is arranged downstream of the compressor (2), and the inlet (4) is arranged downstream of the compressor (2) and of the charge air cooler (3) in the flow direction (16).

18 Claims, 9 Drawing Sheets

(56) References Cited

FOREIGN PATENT DOCUMENTS

| | | |
|---|---|---|
| DE | 102008047079 A1 | 3/2010 |
| DE | 102009042981 A1 | 4/2010 |
| DE | 102010011372 A1 | 10/2010 |
| DE | 102010007092 A1 | 8/2011 |
| DE | 102011056617 A1 | 6/2013 |
| DE | 102011089480 A1 | 6/2013 |
| DE | 102012219796 A1 | 4/2014 |
| DE | 102013111450 A1 | 4/2014 |
| DE | 102013106820 A1 | 12/2014 |
| DE | 102014013502 A1 | 3/2016 |
| DE | 102015012830 A1 | 5/2016 |
| EP | 1355052 A1 | 10/2003 |
| WO | 2014207115 A1 | 12/2014 |

METHODS AND SYSTEM FOR STARTING AN ENGINE

CROSS REFERENCE TO RELATED APPLICATIONS

This application claims priority to German Patent Application No. 102017211684.6, filed Jul. 7, 2017, and German Patent Application No. 102017211675.7, filed Jul. 7, 2017. The entire contents of the above-referenced application are hereby incorporated by reference in their entirety for all purposes.

FIELD

The present description relates to a device for pressure-charging a combustion engine and to a method for removing condensate in a device of this kind. The description furthermore relates to a combustion engine assembly and to a motor vehicle.

BACKGROUND AND SUMMARY

Combustion engines are pressure-charged with the aid of turbochargers in many cases, in conjunction with motor vehicles, for example. This brings about an increase in the efficiency of the engine. Here, the charge air used for pressure-charging is typically cooled with the aid of the charge air cooler. During the cooling process, the charge air cooler produces condensate.

If a charger, e.g. a turbocharger, in particular an electric turbocharger, is arranged after the charge air cooler in the flow direction, there is the risk that condensate will accumulate ahead of the electric turbocharger. For packaging reasons or reasons of efficient arrangement in terms of volume, in conjunction with the motor vehicle for example, it has proven advantageous to position the electric turbocharger geodetically lower than the inlet manifold, in other words below the inlet manifold, and to connect them via a bypass flow duct. The underlying reason for this is, in particular, that the electric turbocharger is not operated continuously but only in connection with specific usage ranges. However, there is the risk that, when starting the electric turbocharger, the quantity of condensate will exceed the permissible limit for the operation of the electric turbocharger or electric compressor or will reach a value which impairs the service life and functionality of the electric turbocharger.

The use of an electrically operated compressor to increase the boost pressure in a bypass line is disclosed in document EP 1 355 052 B1, for example. In document DE 10 2013 106 820 A1, a rise in a relative air humidity in a multistage turbocharger due to a temperature reduction in an intercooler is counteracted by removing moisture. The moisture removal device has a swirl generating element, which has the effect of removing the moisture via the openings in the outer wall. In documents US 2011/0094219 A1 and US 2004/0079079 A1, condensate is in each case discharged into condensate reservoirs via outer walls.

In document DE 199 11 251 A1, a method and a device for detecting the water content in the compressed air flow is disclosed. In DE 10 2011 089 480 A1, a sensor device for detecting at least one property of a flowing medium, in particular a moisture sensor, is disclosed in conjunction with a charge air cooler. In DE 10 2015 012 830 A1, a cooling device for cooling at least one component of a motor car is disclosed, wherein condensate is removed via a valve arranged at the lowest point.

In addition, if a charger, for example a turbocharger, in particular an electrical turbocharger, is arranged downstream of the charge air cooler in the flow direction, there is a risk that condensate will accumulate in front of the electrical turbocharger. For packaging reasons or to ensure an efficient volumetric arrangement, for example in the context of a motor vehicle, it has proved advantageous to place the electrical turbocharger geodetically lower than the inlet manifold, in other words below the inlet manifold, and connect it via a bypass flow channel. This is because, in particular, the electrical turbocharger is not operated permanently but only in connection with specific areas of application. There is however the danger that, on starting of the electrical turbocharger, the quantity of condensate will exceed the permitted limit for operation of the electrical turbocharger or electrical compressor, or reach a value which adversely affects the life and functionality of the electrical turbocharger.

Use of an electrically powered compressor to increase the charge pressure in a bypass line is described for example in document EP 1 355 052 B1. Document DE 10 2009 011 634 A1 describes a condensate extractor for charge air cooler systems, wherein condensate is discharged from the charge air cooler system into a hose element via a specifically designed orifice. A similar solution is disclosed in DE 10 2009 042 981 A1. Document DE 10 2011 056 617 A1 describes a charge air cooler of a compressor of at least one exhaust gas turbocharger, with charge air to be supplied to an internal combustion machine, wherein at least one bypass line is provided between the inlet side and the outlet side of the charge air cooler, and this bypass line is dimensioned such that because of the pressure fall between the inlet side of the charge air cooler and its outlet side, the condensate accumulating can be discharged in the direction of the outlet side. Document DE 10 2010 007 092 A1 describes an exhaust gas recirculation system for an internal combustion machine with an exhaust gas turbocharger, wherein a discharge is provided for condensate which forms in the charge air cooler. DE 102 38 839 A1 describes a charge air cooler with a condensate discharge opening. DE 10 2012 219 796 A1 discloses a charge air supply system which has a condensate collection region.

Given the background situation described, it is an object of the present description to make available an advantageous device for pressure-charging a combustion engine and an advantageous method. This object is achieved by a device for pressure-charging a combustion engine as recited in the claims, a combustion engine assembly as recited in the claims, a motor vehicle as recited in the claims, and a method for removing condensate as recited in the claims. The dependent claims contain further advantageous examples of the description.

The device according to the description for pressure-charging a combustion engine concerns a combustion engine which comprises at least one compressor, e.g. a turbocharger, at least one charge air cooler, at least one inlet to the combustion engine, and a charger. The compressor, the charge air cooler, the inlet and the charger are connected to one another in terms of flow by flow ducts. In this case, the charge air cooler is arranged downstream of the compressor, and the inlet is arranged downstream of the compressor and of the charge air cooler in the flow direction of the charging fluid, generally the charge air. The charger is connected to the inlet via a bypass flow duct arranged between the compressor and the inlet. The charger is arranged geodetically lower or lower in the vertical direction than the inlet, advantageously below the inlet. A moisture sensor is arranged in the bypass flow duct upstream of the charger. The charger can be designed as a turbocharger, e.g. as an electric turbocharger.

In the context described, it is also an object of the present description to provide an advantageous apparatus for charging an internal combustion machine and an advantageous method. This object is achieved by an apparatus for charging an internal combustion machine, an internal combustion machine arrangement, a motor vehicle, and a method for discharging condensate.

The apparatus according to the description for charging an internal combustion machine relates to an internal combustion machine which comprises at least one compressor, for example a turbocharger, at least one charge air cooler, an inlet and a charger. The compressor, the charge air cooler, the inlet and the charger are connected together fluidically via flow channels. In the flow direction of the charging fluid, for example the charge air, the charge air cooler is arranged downstream of the turbocharger. The inlet is arranged downstream of the charge air cooler. The charger is connected to the inlet via a bypass flow channel arranged between the charge air cooler and the inlet. The device according to the description has the advantage that the quantity of the condensate present ahead of the charger can be measured with the aid of the moisture sensor and the charger can be operated in accordance with the result of measurement.

The present description may provide several advantages. In particular, the approach may allow a turbocharger to be activated when condensate is present to remove the condensate and the turbocharger may be deactivated when condensate is not present to reduce energy consumption. Further, the approach allows condensate to be removed from the engine intake system before large amounts of condensate may be formed in the engine intake system. Further still, the condensate may be removed in a way that reduces the possibility of turbocharger degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where:

FIGS. 1 and 4-7 are drawn approximately to scale.

DETAILED DESCRIPTION

Figure 1:
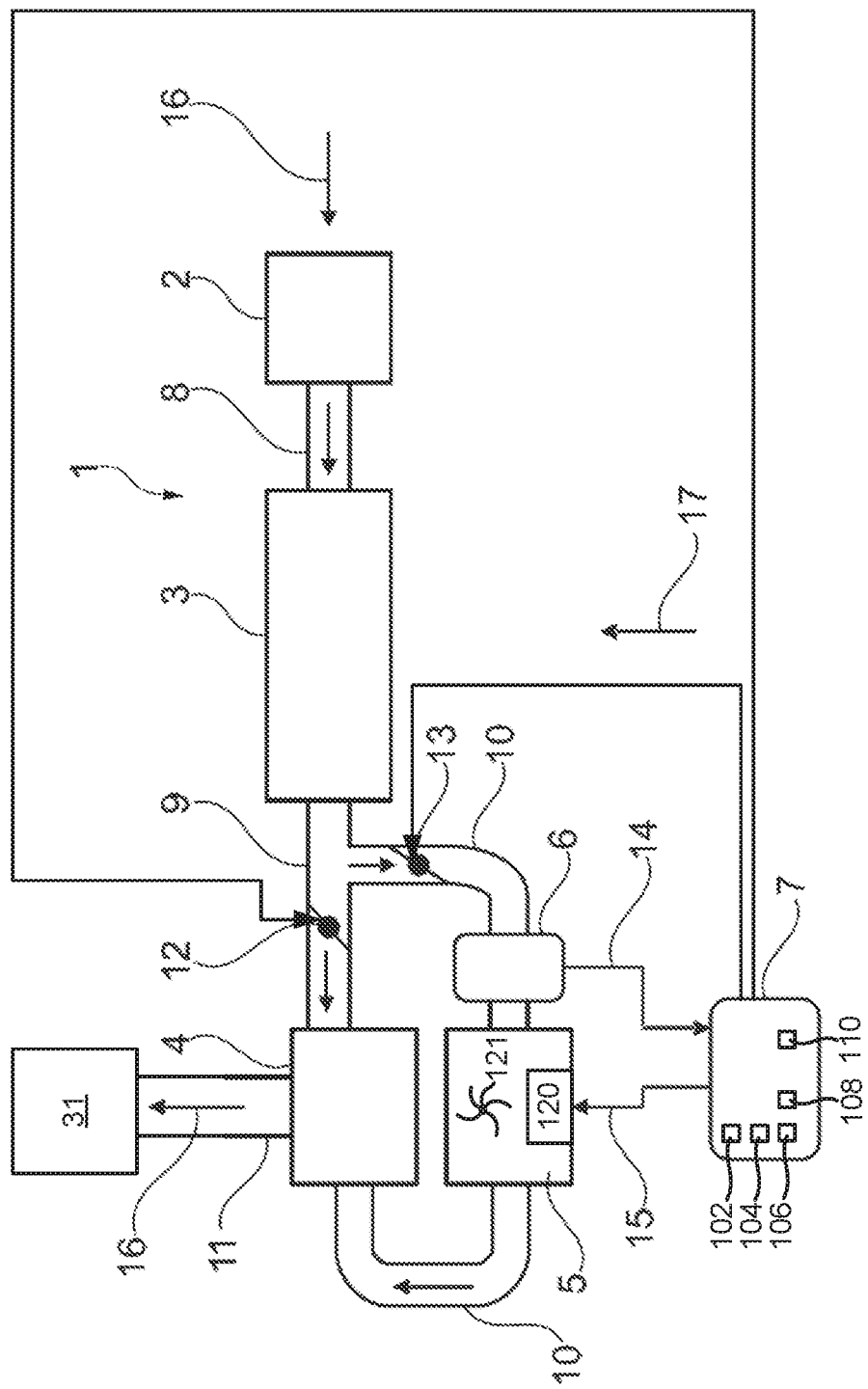
FIG. 1 shows schematically a device according to the description for pressure-charging a combustion engine.

The present description is related to operating an engine that includes a compressor and removing condensate from an engine intake. The engine may operate on diesel, petrol, alcohol, compressed natural gas, propane, or other known fuels. The engine may be included with a system that removes condensate from an engine air intake as shown in FIGS. 1 and 4-7. The engine and system may be operated according to the method of FIGS. 2 and 8. The engine and systems may operate according to the sequence of FIG. 9.

In an advantageous example, the device according to the description comprises a controller, via which the moisture sensor is functionally connected to the charger. In this case, the controller is preferably designed to operate the charger when a quantity of condensate, measured by means of the moisture sensor, in the bypass flow duct exceeds a first threshold. This has the advantage that accumulated condensate ahead of the charger can be discharged through the latter toward the inlet at an early stage. Since operation of the charger to remove condensate takes place only when a certain quantity of condensate has accumulated, the device described allows efficient operation of the charger.

The controller can furthermore be designed to operate the charger for a fixed time period. As an alternative, the controller can be designed to operate the charger until the quantity of condensate falls below a second threshold. In principle, the first threshold and the second threshold can be identical. Preferably, however, the first threshold is higher than the second threshold.

In another variant, at least one valve is arranged in the flow duct arranged between the charge air cooler and the inlet. As an alternative or in addition, at least one valve is arranged in the flow duct arranged between the charge air cooler and the charger, e.g. in the bypass flow duct. With the aid of the valves described, it is possible to exercise open-loop or closed-loop control over the boost pressure at the inlet and, in this context, to exercise open-loop or closed-loop control over the proportion of boost air passed via the charger.

The combustion engine assembly according to the description comprises a combustion engine, e.g. an internal combustion engine, and the device according to the description, as described above, for pressure-charging the combustion engine.

The device according to the description and the combustion engine assembly according to the description can be used in motor vehicles, or on ships, on railroads, in conjunction with stationary engines etc.

The motor vehicle according to the description comprises a combustion engine assembly according to the description as described above. In principle, the combustion engine assembly and the motor vehicle according to the description have the properties and advantages already described in conjunction with the device according to the description. Overall, the device described, the combustion engine assembly described and the motor vehicle described have the advantage that condensate which forms is carried or transferred into the combustion engine before the quantity of condensate is too high and the risk of impairment of the charger or of the engine arises.

The method according to the description for removing condensate in a device according to the description as described above is distinguished by the fact that condensate is transferred or conveyed to the inlet from the bypass flow duct by operating the charger when a quantity of condensate, measured by means of the moisture sensor, in the bypass flow duct exceeds a first threshold.

In an advantageous variant, the charger is operated for a fixed time period. As an alternative, the charger is operated until the quantity of condensate falls below a second threshold. The first threshold and the second threshold can be identical. In a preferred variant, the first threshold is higher than the second threshold. This ensures that the quantity of condensate initially removed brings about a significant reduction in condensate accumulation ahead of the electric turbocharger. At the same time, the intervals between the individual operating sequences of the electric turbocharger are increased to remove condensate at a lower second threshold.

In a preferred variant, the charger is operated at a speed defined for the transfer of condensate. For this purpose, it is possible, for example, to define a suitable speed which avoids damage to the charger due to the transfer of condensate. Operating the charger at the correspondingly defined speed thus has the advantage that condensate is removed in a manner which is gentle for the charger. This can be achieved above all by means of an appropriately low speed.

The device or system 1 (e.g., an engine air intake system) according to the description, shown in FIG. 1, for pressure-charging a combustion engine 31 comprises a compressor designed as an exhaust driven turbocharger 2 (e.g., rotated via exhaust gas from engine 31), a charge air cooler 3, a charger designed as an electric turbocharger 5, and an inlet 4 (e.g., an intake manifold) to the combustion engine. The combustion engine can be an internal combustion engine of a motor vehicle, or of a ship, of a railroad or a stationary engine, for example. The components are connected to one another in terms of flow by flow ducts. The flow direction of the pressure-charging fluid, e.g. the charge air, is indicated by arrow 16.

More particularly, the exhaust driven turbocharger 2 is connected to the charge air cooler 3 in the direction of flow by a flow duct 8. The charge air cooler 3 is connected to the inlet 4 by a flow duct 9. A bypass flow duct 10 branches off from flow duct 9. The bypass flow duct connects the charge air cooler 3 to the electric turbocharger 5. The electric turbocharger 5 is connected to the inlet 4 via the bypass flow duct 10. A compressor 121 of electrically driven turbocharger 5 may be rotated via electric motor 120. The inlet 4 carries the compressed pressure-charging fluid, e.g. compressed air, to the combustion engine 31. This is indicated by a flow duct with the reference numeral 11.

In the design according to the description, the electric turbocharger 5 is arranged below the inlet or at least lower than the inlet 4 in a vertical direction 17. This has advantages in connection with the arrangement of the components within the smallest possible space. Owing to this arrangement, however, there is the risk that condensed water will flow via the bypass flow duct 10 to the electric turbocharger 5 and impair the ability to function thereof.

A moisture sensor 6 is therefore arranged in the bypass flow duct 10 between the charge air cooler 3 and the electric turbocharger 5. The moisture sensor 6 is preferably arranged directly ahead of the electric turbocharger 5 in the direction of air flow. The moisture sensor 6 is connected to a controller or a switch 7, e.g. for signal transmission 14. For its part, the controller or the switch 7 is connected to the electric turbocharger 5 for signal transmission. This is indicated by the reference numeral 15. By way of example, the controller 7 is designed to receive signals relating to the quantity of condensate in the bypass flow duct 10 ahead of the electric turbocharger 5 from the moisture sensor 6. The controller 7 is furthermore preferably designed to exercise open-loop or closed-loop control over the operation of the electric turbocharger 5 in accordance with the measured quantity of condensate. Thus, the electric turbocharger 5 can be operated to convey or transfer the accumulated condensate to the inlet 4, for example, when the quantity of condensate measured by means of the moisture sensor 6 ahead of the electric turbocharger 5 exceeds a first threshold.

In this case, the electric turbocharger 5 can be operated for a certain period of time, for example. Alternatively, it can be operated until the quantity of condensate measured by the moisture sensor 6 falls below a second threshold. In principle, the thresholds mentioned can be identical. However, the first threshold is preferably higher than the second threshold. This ensures regular and efficient removal of condensate.

In FIG. 1, an electrically controlled valve or throttle 12 is arranged between the charge air cooler and the inlet 4. To be more precise, the valve 12 is arranged between the entry opening into the bypass flow duct 10 and the inlet 4. In FIG. 1, another electrically controlled valve or throttle 13 is furthermore arranged in the bypass flow duct 10 between the charge air cooler and the moisture sensor 6. Both valves 12 and 13 allow open-loop and closed-loop control of the air mass flow from the charge air cooler 3 to the inlet 4 and, in particular, of the proportion which is passed via the electric turbocharger 5. Controller 7 may adjust the positions of valves 12 and 13 responsive to vehicle operating conditions. In this way, the charge air pressure at the inlet 4 can be set.

Internal combustion engine 31, comprises a plurality of cylinders (not shown), and it is controlled by electronic engine controller 7. The controller 7 receives signals from the various sensors shown in FIGS. 1 and 4-7 and employs the actuators shown in FIGS. 1 and 4-7 to adjust engine operation based on the received signals and instructions stored in memory of controller 7.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

Controller 7 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 7 is shown receiving various signals from sensors coupled to engine 31, in addition to those signals previously discussed, including: engine coolant temperature; accelerator pedal position; brake pedal position, a measurement of engine manifold pressure; an engine position sensor; a measurement of air mass entering the engine; and measurements of throttle positions. Controller 7 may include executable instructions that are stored in non-transitory memory to perform the methods described herein. Thus, controller 7 may respond to instructions and sensor input to adjust actuators in the physical world to change operating states of the engine 31 and system 1 according to the methods described herein.

During operation, each cylinder within engine 31 typically undergoes a four stroke cycle: the cycle includes the intake stroke, compression stroke, expansion stroke, and exhaust stroke. During the intake stroke, generally, the engine's exhaust valve closes and its intake valve opens. Air is introduced into a combustion chamber via intake manifold 4, and a piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC).

During the compression stroke, the engine's intake valve and exhaust valve are closed. A piston moves toward a cylinder head so as to compress the air within the combustion chamber. The point at which the piston is at the end of its stroke and closest to the cylinder head (e.g. when the combustion chamber is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as a spark plug, resulting in combustion.

During the expansion stroke, the expanding gases push the piston back to BDC. A crankshaft converts piston movement into a rotational torque of the rotary shaft. Finally, during the exhaust stroke, the engine's exhaust valve opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples.

Figure 2:
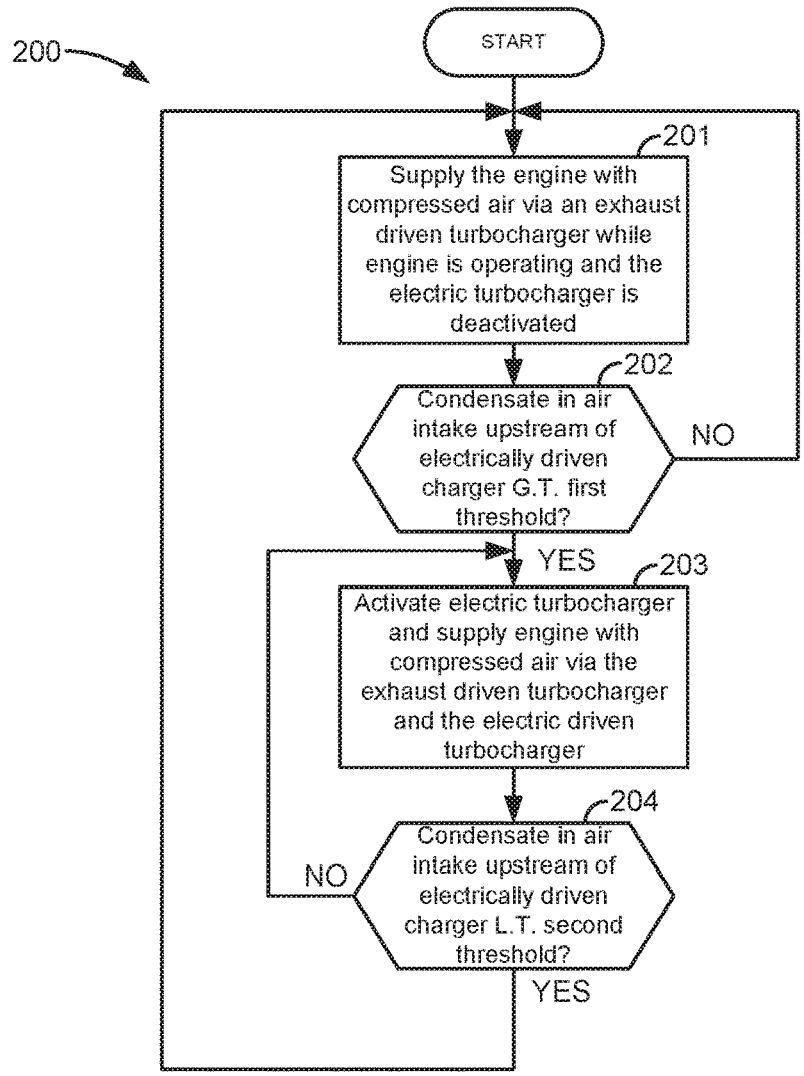
FIG. 2 shows schematically a method according to the description in the form of a flow diagram.
Figure 4:
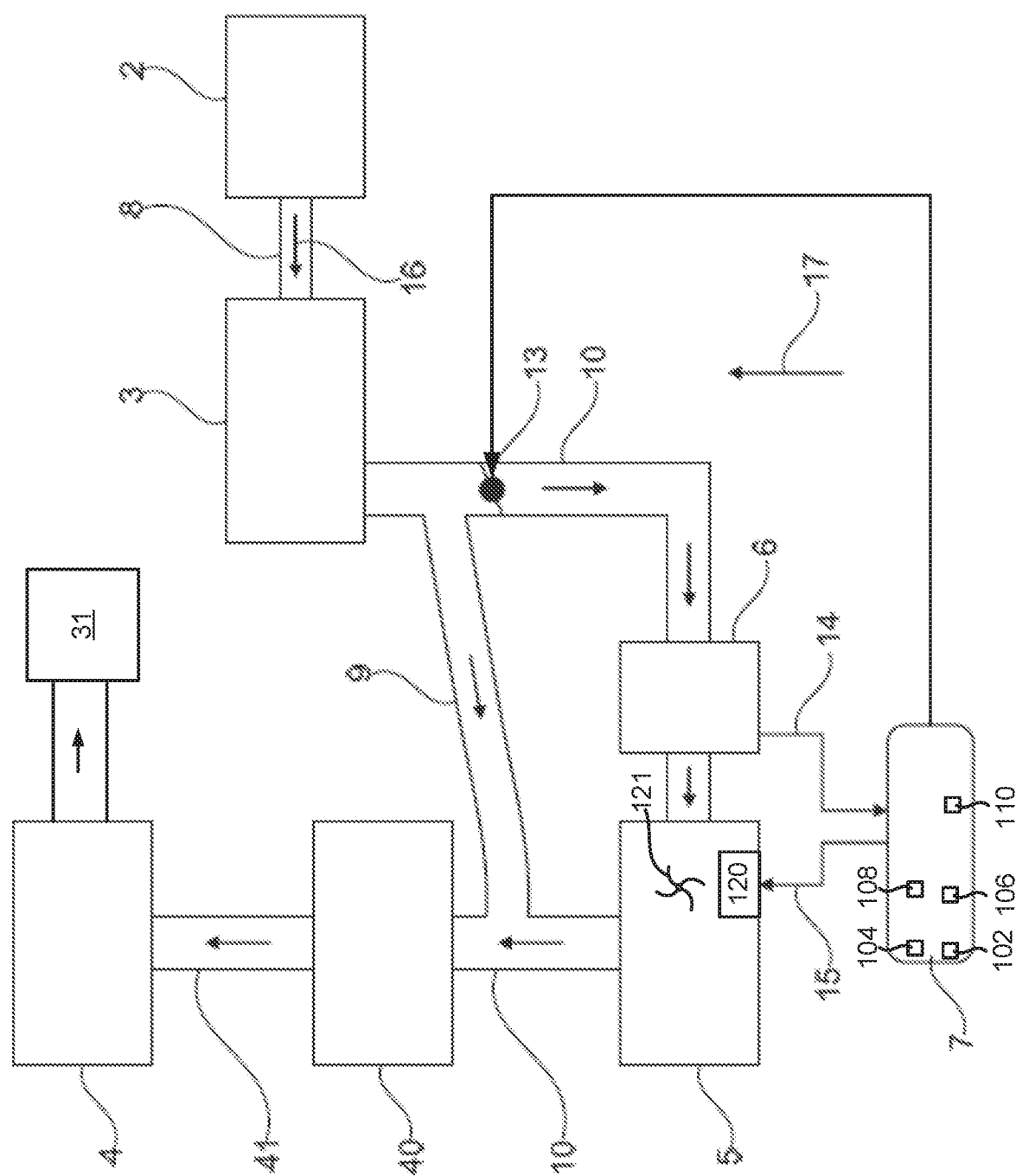
FIG. 4 shows schematically a variant of the device according to the description for pressure-charging a combustion engine.
Figure 5:
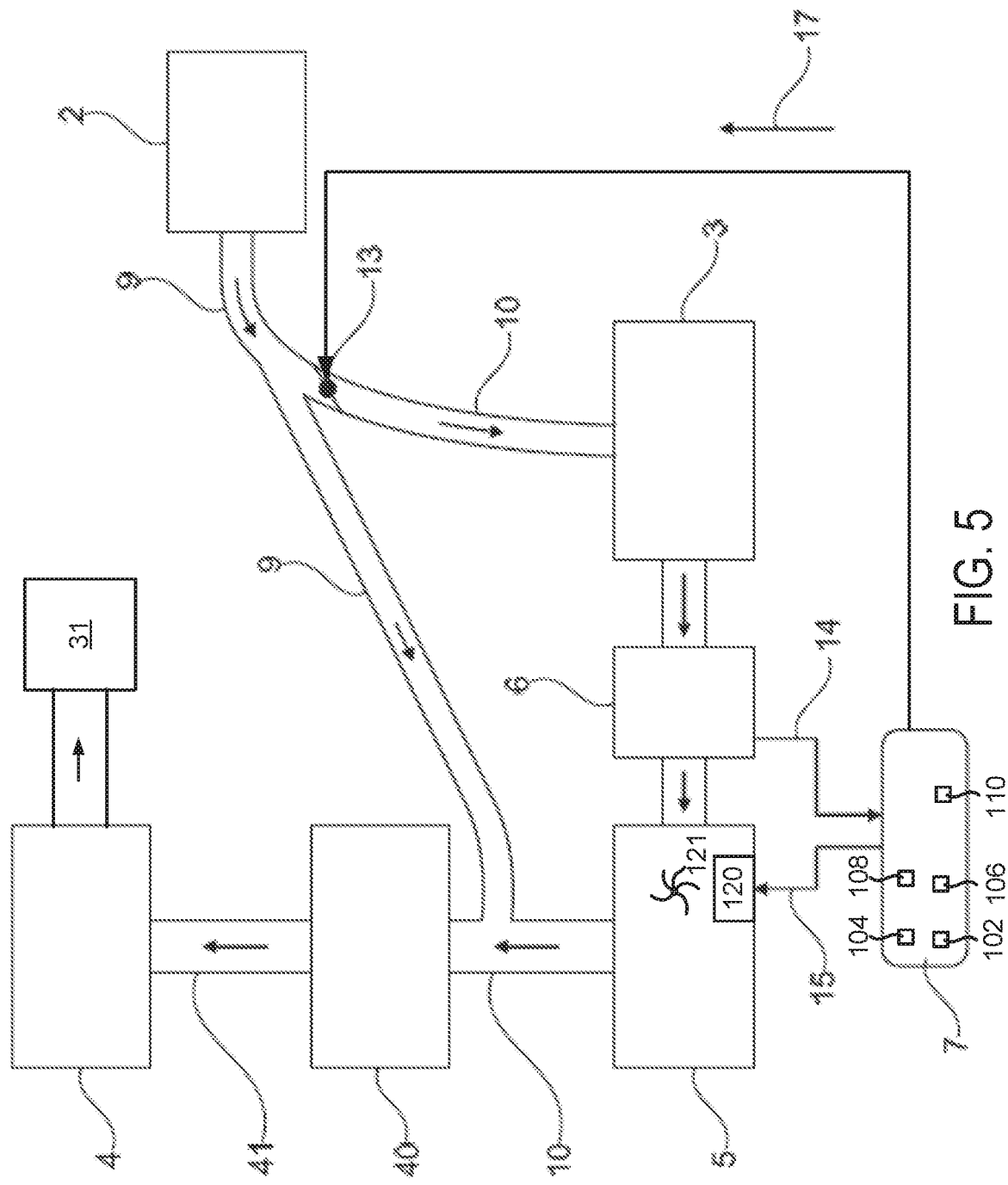
FIG. 5 shows schematically another variant of the device according to the description for pressure charging a combustion engine.

FIG. 2 shows schematically a variant of the method according to the description in the form of a flow diagram for operating the systems of FIGS. 1, 4, and 5. In step 201, the charger, e.g. the electric turbocharger 5, is not in operation and the engine is supplied compressed air via the exhaust gas driven turbocharger. Further, method 200 may fully close throttle 13 and open and close throttle 12 responsive to driver demand torque. Even though throttle 13 is fully closed, condensate may pass throttle 13 via a small clearance gap (not shown). Method 200 proceeds to step 202. In step 202, a check is then made to determine whether the quantity of condensate measured by the moisture sensor 6 ahead of the charger exceeds a first threshold. If this is not the case, the method loops back to step 201. If it is the case, method 200 proceeds to 203. In step 203, the electrically driven charger is put into operation. In an advantageous variant, the electrically driven charger is operated in order to transfer the condensate at a speed defined for this purpose. Further, method 200 may fully close throttle 12 and open and close throttle 13 responsive to driver demand torque. Method 200 proceeds to 204 after activating the electrically driven charger.

In step 204, a check is furthermore made to determine whether the quantity of condensate measured by means of the moisture sensor 6 ahead of the charger falls below a second threshold. If this is not the case, the method loops back to step 203, i.e. the electrically driven charger continues to be operated. If this is the case, that is to say the quantity of condensate measured is below the second threshold, the method loops back to step 201 and the electrically driven charger is therefore switched off.

In principle, the electrically driven charger can be operated for a certain period of time between the individual measurements of the quantity of condensate before a new comparison with the respective threshold is performed. As an alternative, the moisture measurements and the respective comparison with the thresholds can be performed continuously.

Figure 3:
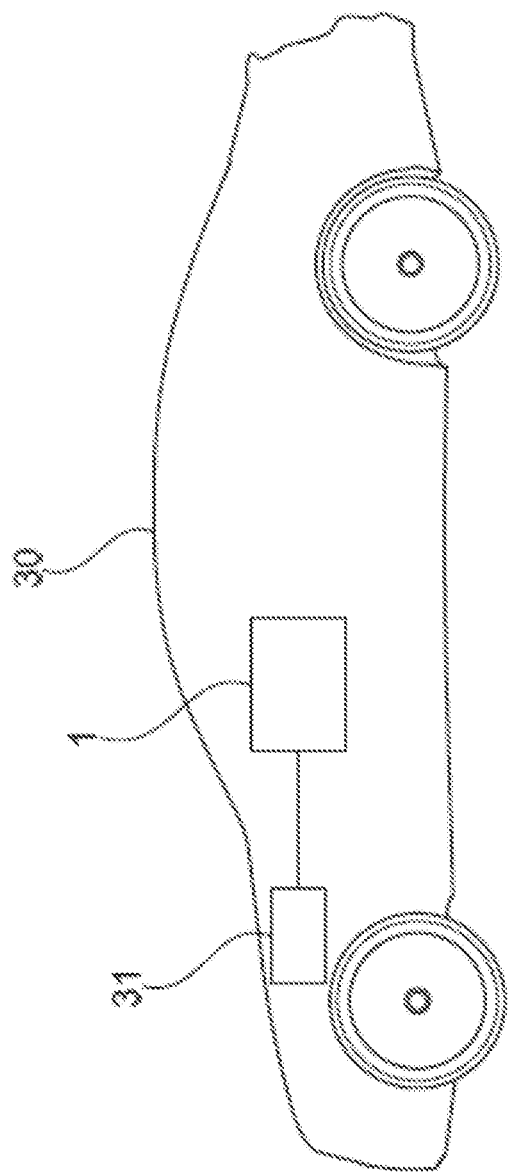
FIG. 3 shows schematically a motor vehicle according to the description.

FIG. 3 shows schematically a motor vehicle 30 according to the description. The motor vehicle 30 according to the description comprises an internal combustion engine 31 and a device 1 according to the description for pressure-charging the internal combustion engine 31. The motor vehicle according to the description can be a passenger car, a heavy goods vehicle, a motorcycle or any other motor vehicle, for example.

Further variants of the device 1 according to the description are shown schematically in FIGS. 4 and 5. In both variants, an intercooler 40 is arranged directly ahead of the inlet 4. The intercooler 40 and the inlet 4 are connected to one another via a flow duct 41.

In FIG. 4, the flow duct 9 connected to the charge air cooler 3 and the bypass flow duct 10 connected to the electrically driven charger 5 are connected to the intercooler 40 in terms of flow. In the flow direction 16, therefore, the fluid coming directly from the charge air cooler 3 through flow duct 9 and the fluid coming from the bypass flow duct 10 are passed into the intercooler 40.

In the variant shown in FIG. 5, as a departure from the variant shown in FIG. 4, the charge air cooler 3 is arranged in the bypass flow duct 10. Here, the charge air cooler 3 is arranged downstream of the valve 13 and upstream of the moisture sensor 6. In this variant, the fluid coming directly from the compressor 2 through flow duct 9 and the fluid coming from the bypass flow duct 10 are passed into the intercooler 40.

Thus, air that is compressed via an exhaust driven turbocharger may enter or bypass a charge air cooler. Output of the charge air cooler including condensed water vapor, may be directed to an electrically driven compressor, the electrically driven compressor may be activated if the condensation exceeds a threshold amount so that the electrically driven compressor may increase temperature and pressure of fluids that flow to the engine so that condensate may be removed from the engine air intake.

In additional examples, the apparatus according to the description is distinguished in that between the charge air cooler and the charger, the bypass flow channel comprises a first channel region and a second channel region. The first channel region runs upward relative to a horizontal in the flow direction. The second channel region is arranged downstream of the first channel region and runs downward relative to the horizontal in the flow direction. The charger may be configured as a turbocharger, for example an electrical turbocharger.

The apparatus according to the description has the advantage that it avoids an accumulation of condensate at the charger, in particular when this is not in operation, i.e. not running. The fall in the bypass flow channel, created between the first channel region and the second channel region, means that condensate produced by the charge air cooler is transported away. In other words, the bypass flow channel to the charger is configured as an inverted siphon. Because the first channel region runs upward, this prevents condensation water from flowing towards the electrical turbocharger, and the condensation water flowing back through the first channel region can thus be conducted straight to the inlet, directly via the flow channel connecting the charge air cooler to the inlet, and hence to the internal combustion machine or combustion engine.

In an advantageous variant, the charger is arranged lower, or geodetically lower, than the inlet in the vertical direction. The charger can thus for example be arranged below the inlet. This allows a compact and space-saving construction.

In a further variant, the apparatus according to the description comprises a first flow channel which connects the charge air cooler directly or straight to the inlet. Here, the first flow channel preferably has a fall in the flow direction. In other words, the charging fluid, for example the charge air, is conducted to the inlet in a direction downward relative to a horizontal. Such an arrangement has the advantage that accumulated condensate can be efficiently discharged to the inlet.

Advantageously, the apparatus according to the description may have a first flow channel which connects the charge air cooler directly or straight to the inlet. Here, an intake opening in the bypass flow channel is preferably arranged on a top side of the first flow channel. Arranging the intake in the bypass flow channel on the top side of the first flow channel has the advantage that an accumulation of condensate on inflow of the charging fluid into the bypass flow channel is already reduced or completely avoided.

The first channel region and/or the second channel region of the bypass flow channel preferably has a central axis which has a gradient or tilt angle of between 10° and 80°. The gradient or tilt angle may in particular lie between 30° and 60°. The gradient or tilt angle relates to a horizontal. In other words, the first channel region may have a central axis with a gradient of between 10° and 80°, preferably between 30° and 60°, relative to the horizontal. In addition or alternatively, the second channel region may have a central axis with a tilt angle of between 10° and 80°, preferably between 30° and 60°, relative to the horizontal. The gradient or tilt angle is selected such that a deposition of condensate in front of the charger is efficiently avoided, and at the same time the charging fluid flow through the bypass channel is not obstructed.

In an advantageous variant, the apparatus according to the description comprises at least one valve arranged in the flow channel between the charge air cooler and the inlet, for example in the first flow channel defined above. Additionally or alternatively, at least one valve may be arranged in the flow channel, for example in the bypass flow channel, between the charge air cooler and the charger. In the bypass flow channel, the valve may preferably be arranged in the first channel region. Using the valve described, the charge pressure at the inlet can be controlled or regulated and in this context, the proportion of charge air conducted via the charger can be controlled or regulated.

The internal combustion machine arrangement according to the description comprises an internal combustion machine, for example an internal combustion engine, and an apparatus according to the description as described above for charging the internal combustion machine.

The motor vehicle according to the description comprises an internal combustion machine arrangement according to the description as described above. It has the same properties, features and advantages as the internal combustion machine arrangement and apparatus according to the description as described above. The motor vehicle may for example be a car, a truck, a minivan, a motorcycle or other vehicle powered by means of an internal combustion machine.

The method according to the description for charging an internal combustion machine concerns an internal combustion machine which comprises at least one compressor, for example a turbocharger, at least one charge air cooler, at least one inlet and a charger. The compressor, the charge air cooler, the inlet and the charger are connected together fluidically via flow channels. In the flow direction, i.e. the flow direction of the charging fluid, for example the charge air, the charge air cooler is arranged downstream of the compressor. The inlet is arranged downstream of the charge air cooler. The charger is connected to the inlet via a bypass flow channel arranged between the charge air cooler and the inlet.

The method is distinguished in that a portion of the charging fluid leaving the charge air cooler, for example the charge air, is conducted through a first channel region of the bypass flow channel which is arranged between the charge air cooler and the charger and runs upward relative to a horizontal in the flow direction. Then the charging fluid is conducted through a second channel region of the bypass flow channel which is arranged between the charge air cooler and the charger and runs downward relative to the horizontal in the flow direction. Preferably, the charging fluid is conducted from the second channel region directly to the charger. The charger may be configured as a turbocharger, for example an electrical turbocharger.

The method according to the description has the advantages already described in connection with the apparatus according to the description. By conducting the charging fluid as described, firstly in an upward and then in a downward direction, the accumulation of condensate in front of the charger is prevented.

As a result, the present description secures the function capacity of the charger arranged below or vertically lower than, or geodetically lower, than an inlet, in relation to deterioration from the accumulation of condensate. At the same time, the service life of the charger is extended.

Figure 6:
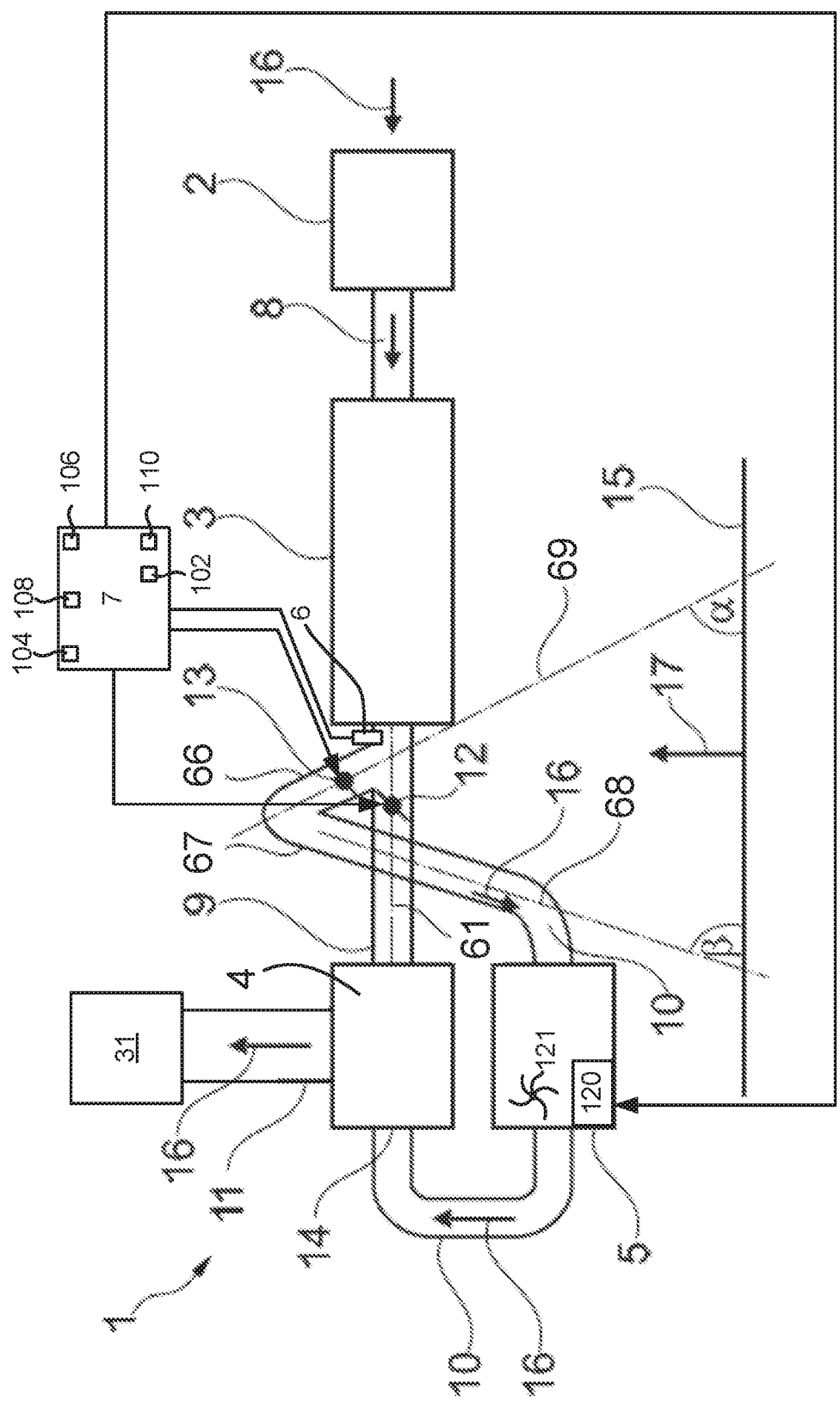
FIG. 6 shows schematically another apparatus according to the description for charging an internal combustion machine.
Figure 7:
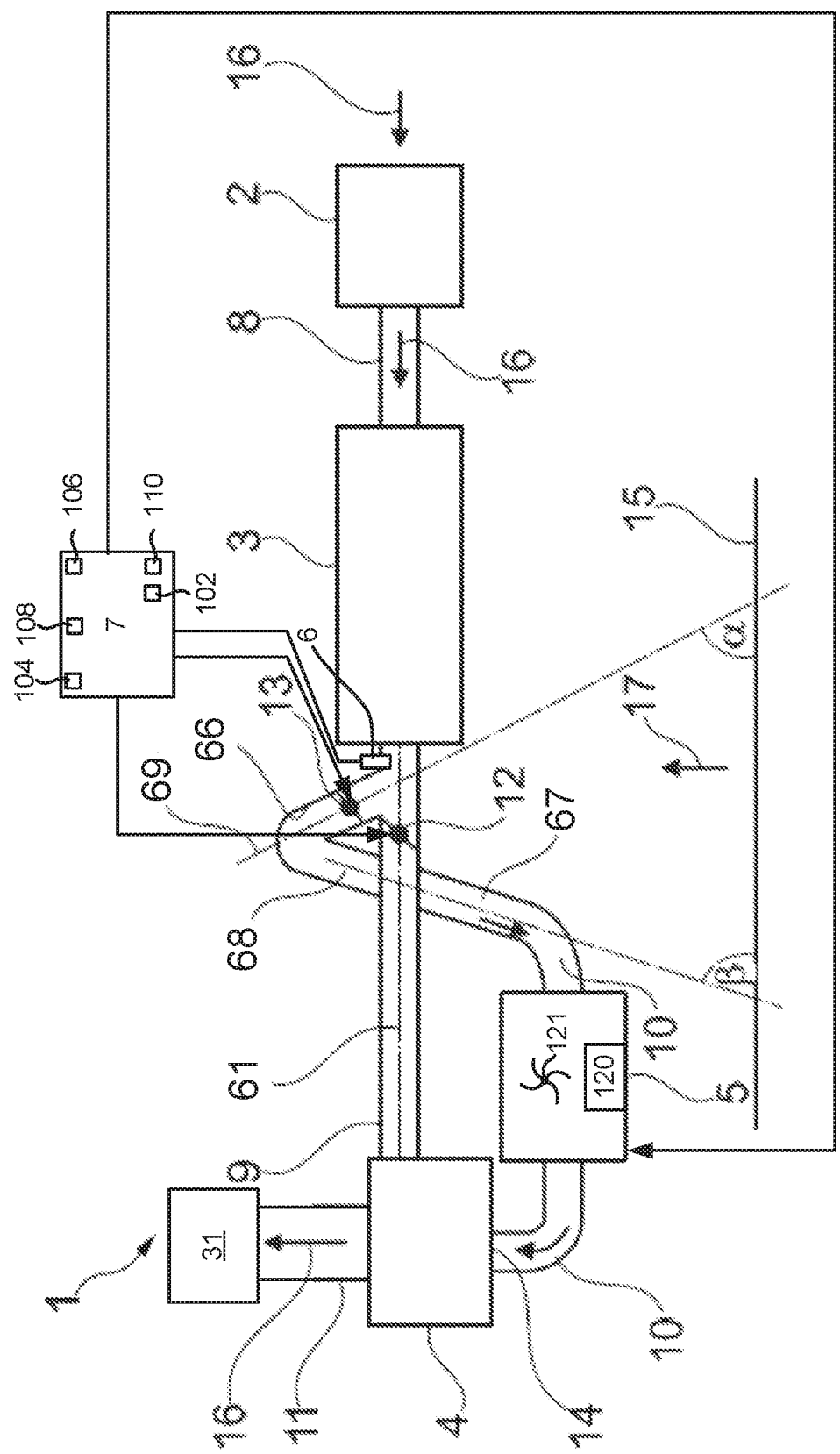
FIG. 7 shows schematically another apparatus according to the description for charging an internal combustion machine.

The apparatus 1 according to the description shown in FIGS. 6 and 7 for charging an internal combustion machine 31 comprises a compressor, for example an exhaust driven turbocharger 2, a charge air cooler 3, a charger, for example an electrical turbocharger 5, and an inlet or intake manifold 4 for the internal combustion machine. The internal combustion machine may for example be an internal combustion engine of a motor vehicle, a ship, a rail vehicle or a stationary power generator arrangement. The components are connected together fluidically by flow channels. The flow direction of the charging fluid, for example the charge air, is marked by arrows 16.

In detail, in the flow direction 16, the exhaust driven turbocharger compressor 2 is connected to the charge air cooler 3 via a flow channel 8. The charge air cooler 3 is connected to the inlet 4 via a flow channel 9. A bypass flow channel 10 branches off the flow channel 9. This connects the charge air cooler 3 to the charger 5. The charger 5 is connected to the inlet 4 via the bypass flow channel 10. The inlet 4 conducts the compressed charging fluid, for example compressed air, to the internal combustion machine. This is indicated by a flow channel with reference numeral 11.

In the structure according to the description, the charger is arranged in a vertical direction 17 below the inlet, or at least lower or geodetically lower than the inlet 4. This has advantages in connection with the arrangement of components in the smallest possible space. Because of this arrangement however, there is a risk that condensation water will flow via the bypass flow channel 10 to the electrically driven charger 5 and adversely affect its functionality. The bypass flow channel 10 therefore comprises a first channel region 66 and a second channel region 67 adjoining this in the flow direction 16.

The first channel region 66 is oriented upward in relation to a horizontal 15. In particular, it comprises a central axis 69 which encloses a tilt angle α of between 10° and 80°, preferably between 30° and 60°, with the horizontal 15. The second channel region 67 is oriented downward in relation to the horizontal 15 in the flow direction 16. It comprises for example a central axis 68 which encloses a tilt angle β of between 10° and 80°, preferably between 30° and 60°, with the horizontal 15. Advantageously, the intake of the flow channel 9 in the bypass flow channel 10 is arranged of the top side of the flow channel 9. With the configuration shown, condensate is prevented from flowing to the charger and adversely affecting its functionality.

In a preferred variant, the flow channel 9 connecting the charge air cooler 3 directly to the inlet 4 has a fall in the flow direction 16. The flow channel 9 thus e.g. has a central axis 61 which encloses an angle of greater than 0° with the horizontal 15. This ensures that condensate in the flow channel 9 flows away towards the inlet 4.

In FIGS. 6 and 7, a valve or throttle 12 is arranged between the charge air cooler 3 and the inlet 4. More precisely, the valve 12 is arranged between the intake opening to the bypass flow channel 10 and the inlet 4. Furthermore, FIGS. 6 and 7 show a further valve or throttle 13 arranged in the bypass flow channel 10 between the charge air cooler 3 and the charger 5. Preferably, the valve 13 is arranged in the first channel region 66. The two valves 12 and 13 allow control or regulation of the air mass flow from the charge air cooler 3 to the inlet 4, and in particular of the portion which is conducted via the charger 5. In this way, the charge air pressure at the inlet 4 can be set.

In the variant shown in FIG. 7, in contrast to the variant shown in FIG. 6 in which the bypass flow channel 10 has an intake 14 arranged at the side by the inlet 4, the intake 14 is arranged at the bottom by the inlet 4. Furthermore, in FIG. 6 the charger 5 is arranged below the inlet 4, and in FIG. 6 next to the inlet 4. In both variants, the charger 5 is however positioned lower than the inlet in the vertical direction 15. The passages 66 and 67 shown in FIGS. 6 and 7 may reduce condensate flow to electric turbocharger 5 via gravity, and if condensate makes it to electric turbocharger 5, then electric turbocharger 5 may pressurize the condensate and allow it to move to the engine in a gas phase.

Figure 8:
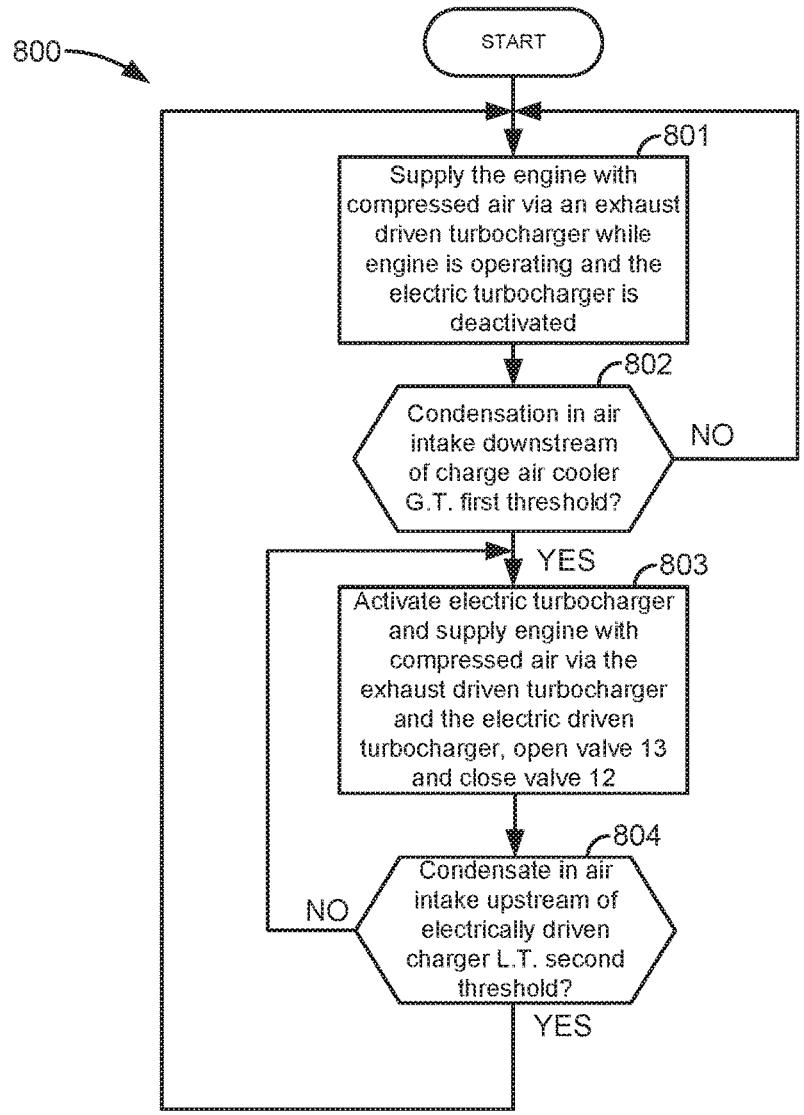
FIG. 8 shows schematically a second method according to the description in the form of a flow diagram.

FIG. 8 shows schematically a variant of the method according to the description in the form of a flow diagram for operating the systems of FIGS. 6 and 7. In step 801, the charger, e.g. the electric turbocharger 5, is not in operation and the engine is supplied compressed air via the exhaust gas driven turbocharger. Further, method 800 may fully close throttle 13 and open and close throttle 12 responsive to driver demand torque. Method 800 proceeds to step 802. In step 802, a check is then made to determine whether the quantity of condensation measured by the moisture sensor 6 downstream of the charge air cooler exceeds a first threshold. If this is not the case, the method loops back to step 801. If it is the case, method 800 proceeds to 803. In step 803, the electrically driven charger is put into operation (e.g., compressing air). In an advantageous variant, the electrically driven charger is operated in order to transfer the condensate at a speed defined for this purpose. Further, method 800 may fully close throttle 12 and open and close throttle 13 responsive to driver demand torque. This allows air that may include condensate to be heated and pressurized so that the condensate may be removed from system 1. Method 800 proceeds to 804 after activating the electrically driven charger.

In step 804, a check is furthermore made to determine whether the quantity of condensation measured by means of the moisture sensor 6 downstream of the charge air cooler falls below a second threshold. If this is not the case, the method loops back to step 803, i.e. the electrically driven charger continues to be operated. If this is the case, that is to say the quantity of condensate measured is below the second threshold, the method loops back to step 801 and the electrically driven charger is therefore switched off. Further, throttle 13 may be fully closed and throttle 12 may be opened and closed responsive to driver demand torque (e.g., torque that is requested by a human operator).

In principle, the electrically driven charger can be operated for a certain period of time between the individual measurements of the quantity of condensate before a new comparison with the respective threshold is performed. As an alternative, the moisture measurements and the respective comparison with the thresholds can be performed continuously.

Figure 9:
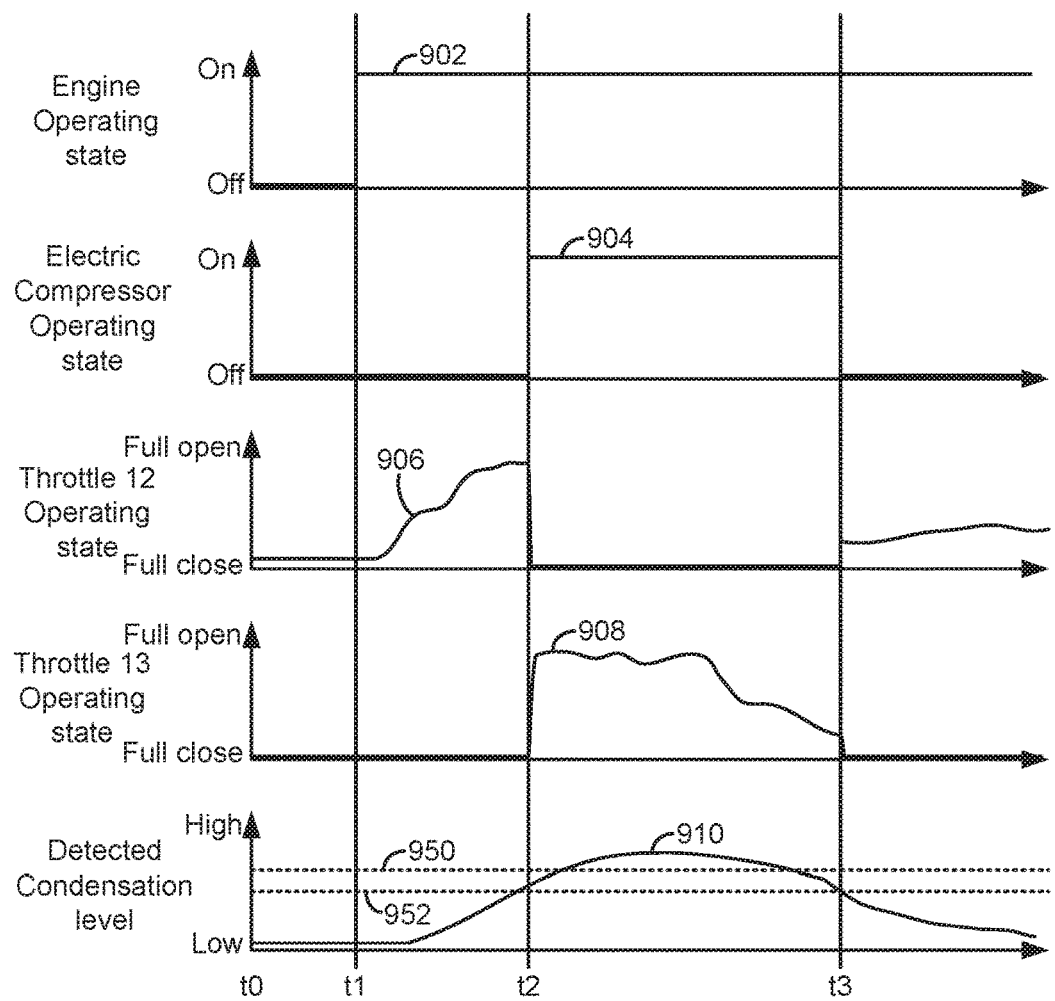
FIG. 9 shows an engine operating sequence according to the methods of FIGS. 2 and 8.

Referring now to FIG. 9, example plots of a vehicle operating sequence are shown. The operating sequence may be performed via the system of FIGS. 1, 4-7 in cooperation with the methods of FIGS. 2 and 8. Vertical lines at times t0-t3 represent times of interest during the sequence. The plots in FIG. 9 are time aligned and occur at the same time.

The first plot from the top of FIG. 9 is a plot of engine operating state versus time. The vertical axis represents engine operating state and the engine is operating (e.g., rotating and combusting fuel) when trace 902 is at a level near the vertical axis arrow that is indicated by the "On" label next to the vertical axis. The engine is not operating (e.g., not combusting fuel and not rotating) when trace 902 is at a lower level of the vertical axis that is indicated by the "Off" label. Line 902 represents engine operating state. The horizontal axis represents time and time increases from the left side of the figure to the right side of the figure.

The second plot from the top of FIG. 9 is a plot of electric compressor operating state versus time. The vertical axis represents electric compressor operating state and the electric compressor is operating (e.g., consuming electric power and rotating) when trace 904 is at a level near the vertical axis arrow that is indicated by the "On" label next to the vertical axis. The electric compressor is not operating (e.g., not consuming electric power and not rotating) when trace 904 is at a lower level of the vertical axis that is indicated by the "Off" label. Line 904 represents electric compressor operating state. The horizontal axis represents time and time increases from the left side of the figure to the right side of the figure.

The third plot from the top of FIG. 9 is a plot of throttle 12 of FIG. 1 operating state versus time. The vertical axis represents throttle operating state and the throttle is fully open when trace 906 is at a level near the vertical axis arrow that is indicated by the "Full open" label next to the vertical axis. The throttle 12 is fully closed when trace 906 is at a lower level of the vertical axis that is indicated by the "Full close" label. Line 906 represents throttle 12 operating state. The horizontal axis represents time and time increases from the left side of the figure to the right side of the figure.

The fourth plot from the top of FIG. 9 is a plot of throttle 13 of FIG. 1 operating state versus time. The vertical axis represents throttle operating state and the throttle is fully open when trace 908 is at a level near the vertical axis arrow that is indicated by the "Full open" label next to the vertical axis. The throttle 13 is fully closed when trace 908 is at a lower level of the vertical axis that is indicated by the "Full close" label. Line 908 represents throttle 13 operating state. The horizontal axis represents time and time increases from the left side of the figure to the right side of the figure.

The fifth plot from the top of FIG. 9 is a plot of detected condensation level or amount versus time. Trace 910 represents the detected amount of condensate in the engine air intake at a location downstream of the charge air cooler. The amount of condensate in the engine air intake increases in the direction of the vertical axis arrow. The horizontal axis represents time and time increases from the left side of the figure to the right side of the figure. Dashed line 950 represents a first threshold level of condensate in the engine air intake. The direction of air flow through the engine air intake may be changed so that air flows through an electrically driven turbocharger when the level of condensate in the engine intake is greater than that of line 950. Dashed line 952 represents a second threshold level of condensate in the engine air intake. The direction of air flow through the engine air intake may be changed so that air does not flow through an electrically driven turbocharger when the level of condensate in the engine intake is less than that of line 952.

At time t0, the engine is stopped (e.g., not rotating) and the electric turbocharger is off. In addition, throttle 12 and throttle 13 are fully closed. The amount of condensate sensed in the engine air intake is low. At time t1, the engine is started as indicated by the engine state changing to a high level to indicate that the engine is operating. The electric turbocharger remains off and throttles 12 and 13 remain fully closed. The amount of condensation remains low.

Between time t1 and time t2, the driver demand increases (not shown) and so the opening amount of throttle 12 is increased responsive to the driver demand torque. Throttle 13 remains fully closed so that air is not bypassed into the electric turbocharger. The detected condensation level increases as humidity increases and as the amount of compressed air increases.

At time t2, the electric turbocharger is activated and throttle 13 is opened in response to the detected condensation level exceeding threshold 950. In addition, throttle 12 is fully closed so that water and condensation has to travel through the electric turbocharger. Between time t2 and time t3, the driver demand torque (not shown) levels off and then decreases. Throttle 13 opening amount levels off and then decreases in response to the driver demand torque. Throttle 12 remains fully closed and the detected condensation level levels off after it increased, and then it decreases.

At time t3, the detected condensation level falls below threshold 952 so throttle 13 is fully closed, throttle 12 is opened, and the electric turbocharger is deactivated. This allows electrical energy to be conserved while little condensate is in the engine air intake.

In this way, air may be circulated to an engine via a first path when the amount of condensate in the engine air intake is low. Air may be circulated to the engine via a second path when the amount of condensate in the engine air intake is high. By flowing air through the second path, the possibility of sending larger water droplets into the engine may be reduced.

The methods and systems described herein provide for a device (1) for pressure-charging a combustion engine (31), which comprises at least one compressor (2), at least one charge air cooler (3), at least one inlet (4) and a charger (5), which are connected to one another in terms of flow by flow ducts (8, 9, 10), wherein the charge air cooler (3) is arranged downstream of the compressor (2), and the inlet (4) is arranged downstream of the compressor (2) and of the charge air cooler (3) in the flow direction (16), and the charger (5) is connected to the inlet (4) via a bypass flow duct (10) arranged between the compressor (2) and the inlet (4), wherein the charger (5) is arranged lower than the inlet (4) in the vertical direction, and a moisture sensor (6) is arranged in the bypass flow duct (10) upstream of the charger (5).

In some examples, the device (1) includes, wherein the device comprises a controller (7) and the moisture sensor (6) is functionally connected to the charger (5) via the controller (7), wherein the controller (7) is designed to operate the charger (5) when a quantity of condensate, measured by means of the moisture sensor (6), in the bypass flow duct (10) exceeds a first threshold. The device (1) includes, wherein the controller (7) is designed to operate the charger (5) for a fixed time period or until the quantity of condensate falls below a second threshold. The device includes, wherein at least one valve (12, 13) is arranged in the flow duct (9) arranged between the charge air cooler (3) and the inlet (4) and/or is arranged in the flow duct (9, 10) arranged between the charge air cooler (3) and the charger (5). The device (1) includes, wherein the compressor (2) and/or the charger (5) is/are designed as a turbocharger. The device (1) includes, wherein the charger (5) is designed as an electric turbocharger. The device includes a combustion engine assembly, which comprises a combustion engine (31) and a device (1) for pressure-charging the combustion engine (31). The device may be included in a motor vehicle (30) which comprises a combustion engine assembly.

The method described herein includes a method for removing condensate in a device (1), wherein condensate from the bypass flow duct (10) is transferred to the inlet (4) by operation of the charger (5) when a quantity of condensate, measured by means of the moisture sensor (6), in the bypass flow duct (10) exceeds a first threshold. The method includes, wherein the charger (5) is operated for a fixed time period or until the quantity of condensate falls below a second threshold. The method includes, wherein the first threshold and the second threshold are identical. The method includes, wherein the first threshold is higher than the second threshold. The method includes, wherein the electric turbocharger (5) is operated at a speed defined for the transfer of condensate.

The description also provides for an apparatus (1) for charging an internal combustion machine (31), which comprises at least one compressor (2), at least one charge air cooler (3), at least one inlet (4) and a charger (5), which are connected together fluidically via flow channels (8, 9, 10), wherein, in the flow direction (16), the charge air cooler (3) is arranged downstream of the compressor (2) and the inlet (4) is arranged downstream of the charge air cooler (3), and the charger (5) is connected to the inlet (4) via a bypass flow channel (10) arranged between the charge air cooler (3) and the inlet (4), wherein between the charge air cooler (3) and the charger (5), the bypass flow channel (10) comprises a first channel region (6) which runs upward relative to a horizontal (15) in the flow direction (16), and a second channel region (7) which is arranged downstream of the first channel region (6) and runs downward relative to the horizontal (15) in the flow direction (16).

In some examples, the apparatus (1) includes wherein the charger (5) is arranged lower than the inlet (4) in the vertical direction (17). The apparatus (1) includes, wherein a first flow channel (9) connects the charge air cooler (3) directly to the inlet (4), wherein the first flow channel (9) has a fall in the flow direction (16). The apparatus (1) includes, wherein a first flow channel (9) connects the charge air cooler (3) directly to the inlet (4), and an intake opening in the bypass flow channel (10) is arranged on a top side of the first flow channel (9). The apparatus (1) includes, wherein the first channel region (6) and/or the second channel region (7) of the bypass flow channel (10) has a central axis (26, 27) which has a tilt angle ($\alpha$, $\beta$) of between 10 and 80 degrees relative to a horizontal (15). The apparatus (1) includes, wherein the first channel region (6) and/or the second channel region (7) has a central axis (26, 27) which has a tilt angle ($\alpha$, $\beta$) of between 30 and 60 degrees relative to a horizontal (15). The apparatus (1) includes, wherein at least one valve (12, 13) is arranged in the flow channel (9) between the charge air cooler (3) and the inlet (4), and/or in the flow channel (9, 10) arranged between the charge air cooler (3) and the charger (5). The apparatus (1) includes wherein the compressor (2) and/or the charger (5) are configured as a turbocharger. The apparatus (1) includes, wherein the charger (5) is configured as an electrically driven turbocharger. The description also provides for an internal combustion machine arrangement which comprises an internal combustion machine (31) and an apparatus (1) for charging the internal combustion machine (31). A motor vehicle (30) which comprises an internal combustion machine arrangement.

The description also provides for a method for charging an internal combustion machine (31), which comprises at least one compressor (2), at least one charge air cooler (3), at least one inlet (4) and a charger (5), which are connected together fluidically via flow channels (8, 9, 10), wherein, in the flow direction (16), the charge air cooler (3) is arranged downstream of the compressor (2) and the inlet (4) is arranged downstream of the charge air cooler (3), and the charger (5) is connected to the inlet (4) via a bypass flow channel (10) arranged between the charge air cooler (3) and the inlet (4), wherein a portion of the charging fluid leaving the charge air cooler (3) is conducted through a first channel region (6) of the bypass flow channel (10) which is arranged between the charge air cooler (3) and the charger (5) and runs upward relative to a horizontal (15) in the flow direction (16), and is then conducted through a second channel region (7) of the bypass flow channel (10) which is arranged between the charge air cooler (3) and the charger (5) and runs downward relative to the horizontal (15) in the flow direction (16). The method includes, wherein the compressor (2) and/or the charger (5) are configured as turbochargers. The method includes, wherein the charger (5) is configured as an electrical turbocharger.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A device for pressure-charging a combustion engine, which comprises:
at least one compressor, at least one charge air cooler, at least one inlet, and a charger, which are connected to one another in terms of flow by flow ducts, wherein the charge air cooler is arranged downstream of the at least one compressor, and the inlet is arranged downstream of the at least one compressor and of the charge air cooler in the flow direction, and the charger is connected to the inlet via a bypass flow duct arranged between the at least one compressor and the inlet, wherein the charger is arranged lower than the inlet in the vertical direction with respect to gravity, and a moisture sensor is arranged in the bypass flow duct upstream of the charger.

2. The device of claim 1, wherein the device comprises a controller and the moisture sensor is functionally connected to the charger via the controller, wherein the controller is designed to operate the charger when a quantity of condensate, measured by means of the moisture sensor, in the bypass flow duct exceeds a first threshold.

3. The device of claim 2, wherein the controller is designed to operate the charger for a fixed time period or until the quantity of condensate falls below a second threshold.

4. The device of claim 3, wherein at least one valve is arranged in a flow duct arranged between the charge air cooler and the inlet and/or is arranged in a flow duct arranged between the charge air cooler and the charger.

5. The device of claim 4, where the compressor is a turbocharger compressor and wherein the charger is an electrically driven turbocharger.

6. The device of claim 1, wherein the device is coupled to an engine.

7. The device of claim 2, wherein the device is included in a vehicle.

8. An engine operating method, comprising:
activating an electrically driven turbocharger, at least partially opening a second throttle, and fully closing a first throttle via a controller in response to a condition where an amount of condensate in an engine air intake exceeds a first threshold level, the electrically driven turbocharger having at least one compressor, at least one charge air cooler, at least one inlet, and a charger, which are connected to one another in terms of flow by flow ducts, wherein the charge air cooler is arranged downstream of the at least one compressor, and the inlet is arranged downstream of the at least one compressor and of the charge air cooler in the flow direction, and the charger is connected to the inlet via a bypass flow duct arranged between the at least one compressor and the inlet, wherein the charger is arranged lower than the inlet in the vertical direction with respect to gravity, and a moisture sensor is arranged in the bypass flow duct upstream of the charger.

9. The method of claim 8, wherein the electrically driven turbocharger is operated for a fixed time duration or until the amount of condensate is less than a second threshold level.

10. The method of claim 9, wherein the first threshold and the second threshold are equal.

11. The method of claim 9, wherein the first threshold is greater than the second threshold.

12. The method of claim 8, further comprising at least partially opening a fully closed second throttle in response to the condition.

13. The method of claim 8, further comprising fully closing a partially open first throttle in response to the condition.

14. A system, comprising:
least one compressor; at least one charge air cooler; at least one inlet; a charger, which are connected together fluidically via flow channels, wherein, in a flow direction, the at least one charge air cooler is arranged downstream of the at least one compressor, and the inlet is arranged downstream of the at least one charge air cooler, and the charger is connected to the inlet via a bypass flow channel arranged between the charge air cooler and the inlet, wherein between the charge air cooler and the charger, the bypass flow channel comprises a first channel region which runs upward relative to a horizontal in the flow direction, and a second channel region which is arranged downstream of the first channel region and runs downward relative to the horizontal in the flow direction, where the charger is arranged vertically lower than the inlet with respect to gravity.

15. The system of claim 14, where a first flow channel connects the charge air cooler directly to the inlet, wherein the first flow channel has a fall in the flow direction.

16. The system of claim 15, where a first channel region and a second channel region of the bypass flow channel has a central axis which has a tilt angle of between 10 and 80 degrees relative to a horizontal.

17. The system of claim 16, where the first channel region or the second channel region has a central axis which has a tilt angle of between 30 and 60 degrees relative to the horizontal.

18. The system of claim 17, where at least one valve is arranged in the flow channel between the charge air cooler and the inlet or in the flow channel arranged between the charge air cooler and the charger.

\* \* \* \* \*